G. J. RACKHAM.
MEANS OF SUSPENSION OF VEHICLES.
APPLICATION FILED JULY 27, 1920.
1,379,836.
Patented May 31, 1921.
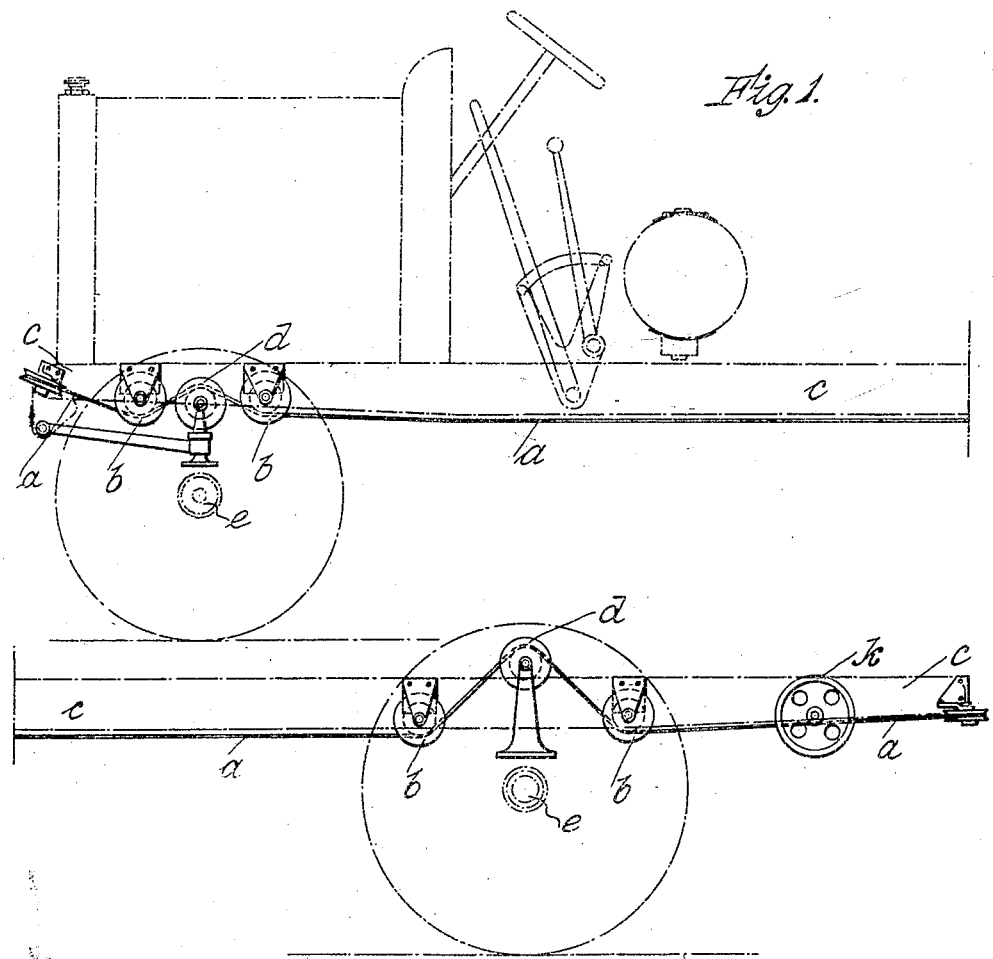
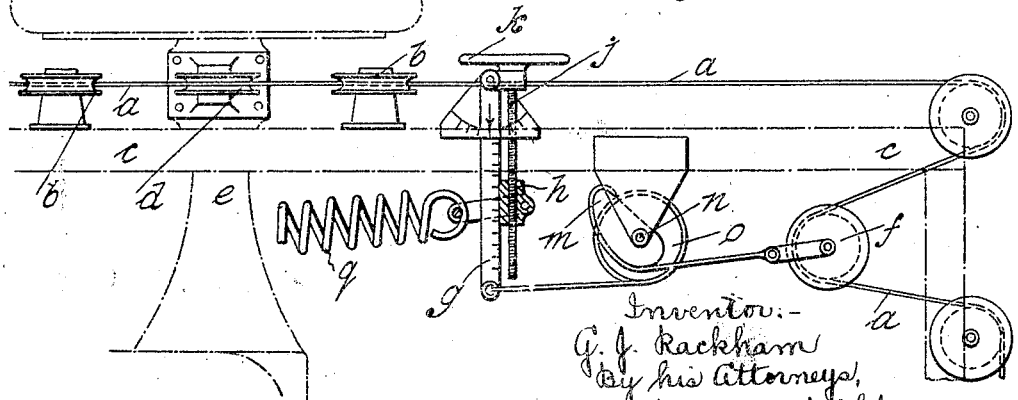

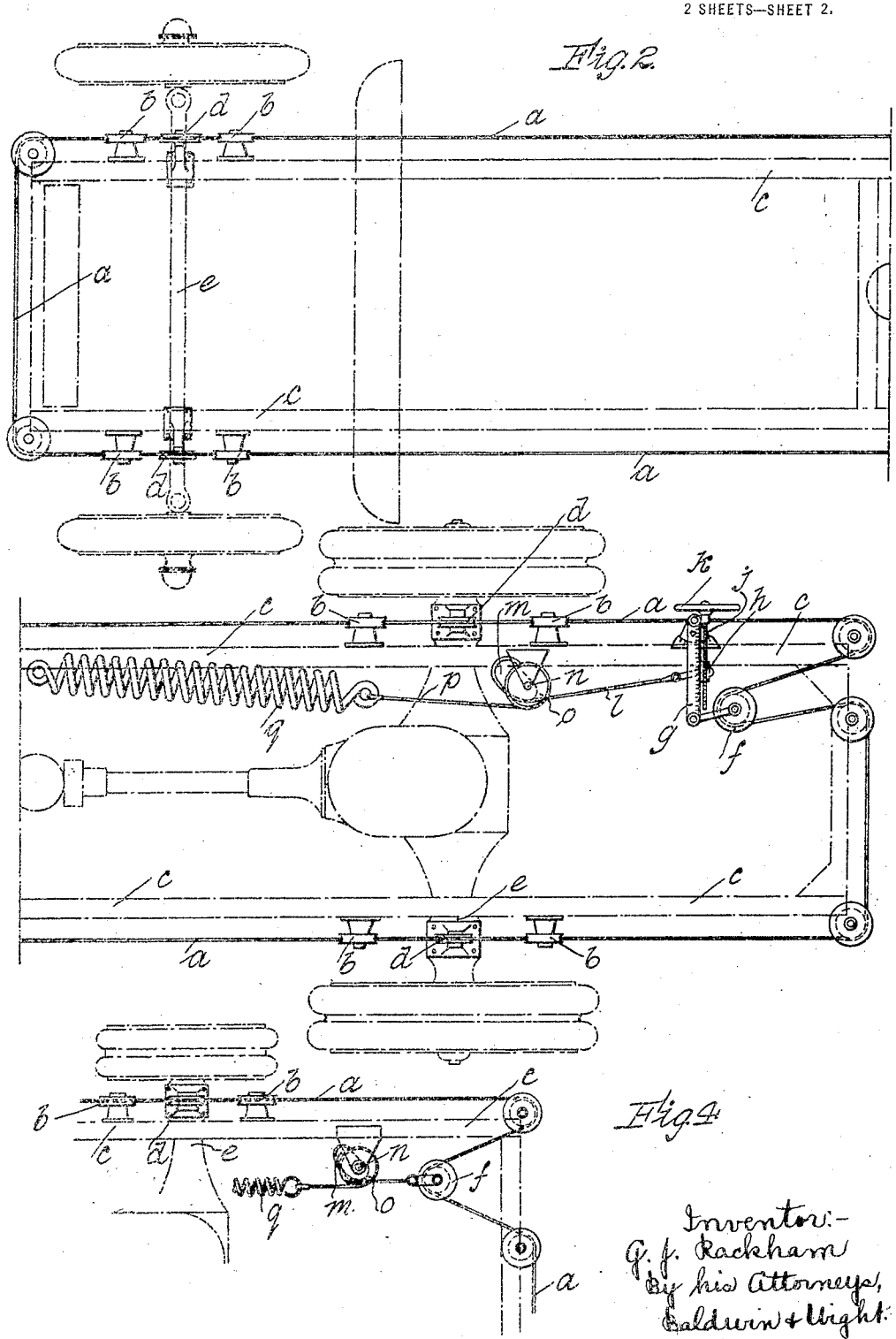

UNITED STATES PATENT OFFICE.

GEORGE JOHN RACKHAM, OF PUTNEY, LONDON, ENGLAND.

MEANS OF SUSPENSION OF VEHICLES.

1,379,836.  Specification of Letters Patent.  Patented May 31, 1921.

Application filed July 27, 1920. Serial No. 399,368.

*To all whom it may concern:*

Be it known that I, GEORGE JOHN RACKHAM, a subject of the King of Great Britain, residing at 146 Upper Richmond Road, Putney, London, England, have invented new and useful Improvements in Means of Suspension of Vehicles, of which the following is a specification.

This invention relates to means of suspension of vehicles by suspension ropes such as are described in the United States specification No. 1329769 and in the British specification No. 21796 of 1919. In these specifications the suspension of vehicles on a rope or ropes passing over pulleys on the axles and under pulleys on the frame is described, a spring being introduced into or connected to the suspension rope to maintain the necessary tension in the rope.

One object of this invention is to control the tension in the rope for all extensions of the spring or up and down movement of the axles.

Another object of the invention is the provision of means for readily adjusting the tension of the rope to suit any increase or decrease of load put on the vehicle.

A third object is to provide a method of automatically indicating the weight of the load on the vehicle.

According to this invention the suspension rope is connected to the end of a lever or around a pulley mounted at the end of a lever which is pivoted to the frame of the vehicle. A yoke engages the lever and means such as a screw are provided for adjusting the position of the yoke along the length of the lever. To a shaft capable of turning in bearings upon the frame is fixed a pulley and a cam, and a rope connected to the yoke is anchored upon the cam while another rope is anchored by one end to the pulley and connected at its other end to a spring.

The cam is so formed that the rope connected to it exerts a varying stress on the pulley so that the spring maintains a constant or if desired a varying load on the rope between the cam and the yoke when the cam is rotated and consequently extending the spring. By these means any desired load is obtained on the suspension rope for any extension of the effective length of the rope due to the up and down movement of the axles, which condition is desirable if the load on the vehicle is constant. If the load is increased, however, a corresponding increase of tension in the suspension rope is desirable to maintain the vehicle at its same level; this is obtained by moving the yoke along the length of the lever by means of a screw and hand wheel.

The position of the yoke along the lever can, therefore, always be adjusted to a definite load on the vehicle, and the lever is marked accordingly with this load and thus the load can be weighed.

Alternatively to the above arrangement the lever can be interposed between the cam and spring.

In cases in which the variation of the load is small, as in small vehicles used for carrying passengers I may dispense with the pivoted lever, the suspension rope being anchored to the cam as above set out.

The accompanying drawings show a vehicle suspended according to this invention. Figure 1 is a side elevation and Fig. 2 is a plan. Figs. 3 and 4 show modifications.

An endless suspension rope $a$ passes under pulleys $b$, $b$, on the frame $c$ of the vehicle and over pulleys $d$ carried on the axles $e$. The rope $a$ also passes around a pulley $f$ connected to a lever $g$ pivoted to the frame $c$; capable of sliding on the lever $g$ is a yoke $h$ whose position upon the lever is adjusted by means of a screw $j$ turned by a handle $k$. The yoke $h$ is connected by a rope $l$ to a cam $m$ mounted on a shaft $n$ on which is also mounted a pulley $o$. Another rope $p$ connects the pulley $o$ to a spring $q$. The cam $m$ is so formed that the rope $p$ exerts a varying stress on the pulley so that the spring $q$ maintains a constant or if desired a varying load on the rope $l$ when the cam is rotated and the spring $q$ consequently extended. The position of the yoke $h$ upon the lever $g$ may be adjusted to a definite load on the vehicle and the lever $g$ is marked as shown thus enabling the load to be weighed.

In Fig. 3 the lever $g$ is placed between the spring $q$ and the cam $m$, the yoke $h$ being connected to the spring $q$.

In Fig. 4 the lever $g$ is dispensed with, the pulley $f$ is connected to the cam $m$ and the spring $q$ to the pulley $o$.

What I claim is:—

1. A vehicle combined with pulleys on the axles, pulleys on the frame of the vehicle, a suspension rope passing over the pulleys on the axles and under the pulleys on the frame, a spring attached to the frame, a cam pivoted to the frame, and connections between the suspension rope and the cam and between the spring and the cam.

2. A vehicle combined with pulleys on the axles, pulleys on the frame of the vehicle, a suspension rope passing over the pulleys on the axles and under the pulleys on the frame, a spring attached to the frame, a cam pivoted to the frame, a lever pivoted to the frame and connected to the suspension rope, and connections between the lever and the cam and between the spring and the cam.

3. A vehicle combined with pulleys on the axles, pulleys on the frame of the vehicle, a suspension rope passing over the pulleys on the axles and under the pulleys on the frame, a spring attached to the frame, a cam pivoted to the frame, a lever pivoted to the frame and connected to the suspension rope, a yoke, means for sliding the yoke along the lever, and connections between the yoke and the cam and between the spring and the cam.

GEORGE JOHN RACKHAM.